United States Patent [19]
Droulon et al.

[11] Patent Number: 5,725,452
[45] Date of Patent: *Mar. 10, 1998

[54] CLEARANCE TAKE-UP ARTICULATION FOR AN AUTOMOBILE SEAT

[75] Inventors: Georges Droulon, St. Georges des Groseillers; Francois Baloche, Flers, both of France

[73] Assignee: Bertrand Faure Automobile "BFA", Massy, France

[*] Notice: The term of this patent shall not extend beyond the expiration date of Pat. No. 5,536,217.

[21] Appl. No.: 632,274

[22] Filed: Apr. 15, 1996

Related U.S. Application Data

[63] Continuation-in-part of Ser. No. 258,200, Jun. 10, 1994, Pat. No. 5,536,217.

[51] Int. Cl.$^6$ .................................................... F16H 1/32
[52] U.S. Cl. ................................................ 475/162; 297/362
[58] Field of Search .............................. 297/362, 362.12; 475/162, 176, 177

[56] References Cited

U.S. PATENT DOCUMENTS

| | | | |
|---|---|---|---|
| 5,536,217 | 7/1996 | Drouvon et al. | 477/177 |
| 5,611,747 | 3/1997 | Bauer et al. | 475/162 |

*Primary Examiner*—Khoi Q. Ta
*Attorney, Agent, or Firm*—Dougherty & Dremann

[57] ABSTRACT

An articulation for an automobile seat includes a mobile flange having an inner toothing, a fixed flange having an inner toothing for cooperating directly with the mobile flange and an eccentric means positioned between the mobile flange and the fixed flange for biasing aa articulating element. The eccentric means including a driving axis provided with a snug and a pair of discs rotatable about the axis relative to one another. Each disc having a central recess and an arc-shaped window. The central recess having a hollow housing extending outwardly for receiving the snug of the axis. A resilient member is positioned within the arc-shaped windows of the discs and bears against bearing surfaces provided at the ends of the windows. When the two discs are spaced apart from one another by the eccentric means, the articulation ensures the clearance take-up and the irreversibility of the articulation.

22 Claims, 4 Drawing Sheets

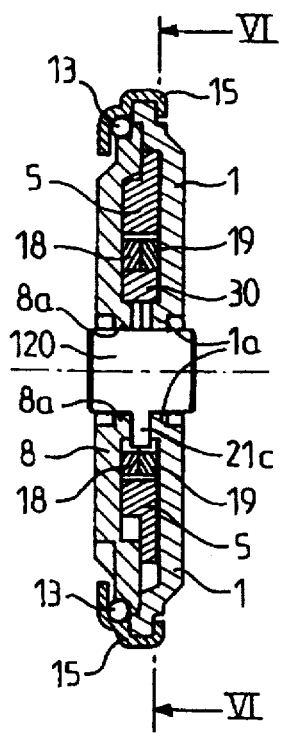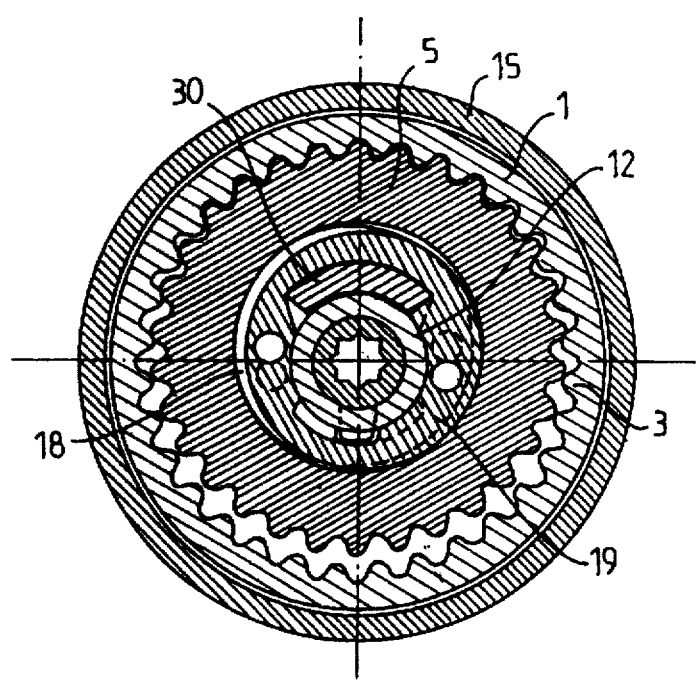
FIG. 5　　　　　FIG. 6
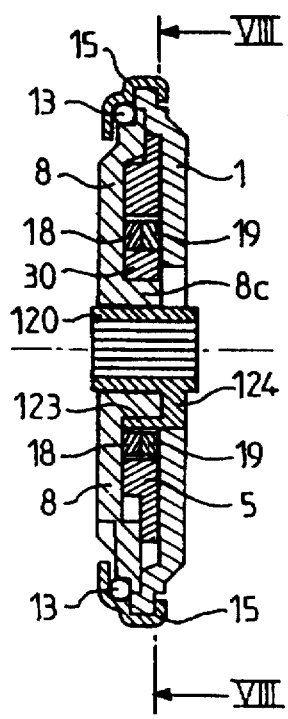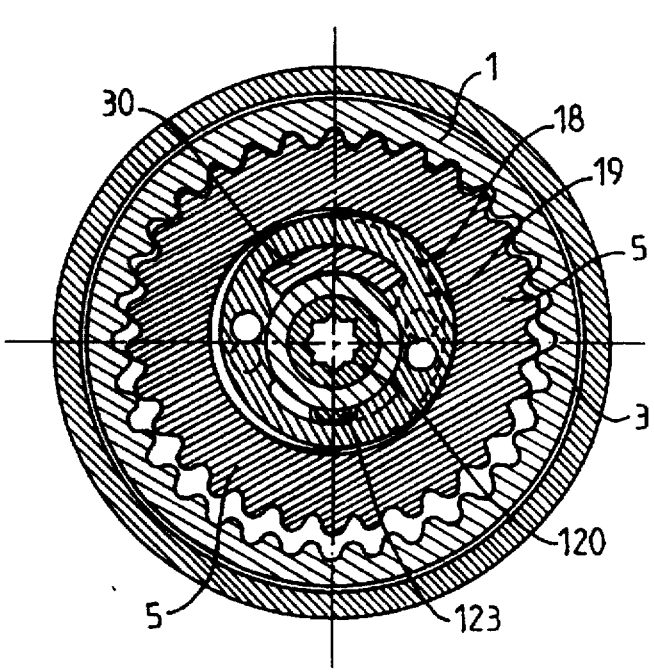
FIG. 7　　　　　FIG. 8

5,725,452

1

CLEARANCE TAKE-UP ARTICULATION FOR AN AUTOMOBILE SEAT

CROSS REFERENCE TO RELATED APPLICATION

This application is a continuation-in-part of U.S. patent application Ser. No. 08/258,200, filed on Jun. 10, 1994, now U.S. Pat. No. 5,536,217, and entitled: CLEARANCE TAKE-UP ARTICULATION USED IN AUTOMOBILE SEATS.

FIELD OF THE INVENTION

The invention relates to a clearance take-up articulation used in automobile seats.

BACKGROUND OF THE INVENTION

The object of the present invention relates to an articulation used in automobile seats, notably for setting the inclination of the seat-back or ensuring a stable position for the seat or for setting the inclination of the seat head-rest placed atop the seat-back.

Articulations incorporated in vehicle seats according to the above objective are known, the driving of which is done either via a satellite or directly on the mobile flange, these articulations typically include two half-cams pressed back by a central resilient member.

Such an articulation is disclosed in document FR-A-2 649 050 in which the driving is done via a satellite. A similar articulation is described in document FR-A-2 479 885, in which the driving is applied directly on the mobile flange. These documents, however, do not provide for the irreversibility of the articulation, but only for the clearance take-up.

An articulation is known from document DE-A-3 419 492 is an including flanges, with or without satellites, provided with conical toothings pressed by an axially actuating spring which allows the clearance between the toothings to be taken-up. This articulation also includes a driving cam comprising two circular discs spaced apart from one another by a spring to take-up the bearing clearances.

A further object of the invention is to avoid using conical toothings and to take-up the toothings clearance via the two cam discs, while ensuring the take-up of the bearing clearance and the irreversibility of the articulation.

SUMMARY OF THE INVENTION

According to the invention, the articulation includes a fixed flange having an inner toothing for cooperating either with a double satellite, the toothings of which mesh on one side with the fixed flange toothings and on the other side with the inner toothing of a mobile flange, or directly with the inner toothing of the mobile flange, an eccentric acting either on the satellite or directly on the mobile flange, a driving axis for the eccentric provided with at least one snug, the eccentric being made of two discs angularly mobile with respect to one another and connected to one another by a resilient element housed in two arc-shaped windows. The central portion of these discs is each formed with at least one circular recess, extended by a hollow housing adapted for receiving the driving axis snug, this articulation being characterized in that each disc is non-circular and is housed inside a bore of the satellite or the mobile flange. The two discs, when in a position spaced apart from one another, ensure the clearance take-up and the irreversibility of the articulation.

According to another embodiment of the invention for ensuring the control of the articulation, the two hollow housings of the discs are angularly offset when the two discs are in a position where they are spaced apart from one another, in order that the snug acts first on one disc for unblocking the eccentric, then on the two simultaneously.

According to another embodiment of the invention to guarantee the action of the spring, each arc-shaped window includes at one end a recess providing the spring with a bearing surface on a single arc-shaped window.

According to another embodiment of the invention, the articulation is characterized in that the connection between the fixed flange and the mobile flange is provided via a crimped ring with interposition of a crown made of balls between this ring and the mobile flange.

Various other embodiments of the invention will become more apparent from the following detailed description.

BRIEF DESCRIPTION OF THE DRAWINGS

The foregoing and other objects will become more readily apparent by referring to the following detailed description and the appended drawings in which:

FIG. 5 is a diametrical sectional view of an alternative embodiment of an articulation mechanism according to the invention.

FIG. 6 is a sectional view along line VI—VI of FIG. 5.

FIG. 7 is a diametrical sectional view of an alternative embodiment of the satellite driving mechanism.

FIG. 8 is sectional view along line VIII—VIII of FIG. 7.

FIG. 12 is an exploded perspective view similar to FIG. 1 of an alternative embodiment of the articulation; and FIG. 12A is a sectional view of a portion of the articulation of FIG. 12.

DETAILED DESCRIPTION OF THE INVENTION

Figure 1:
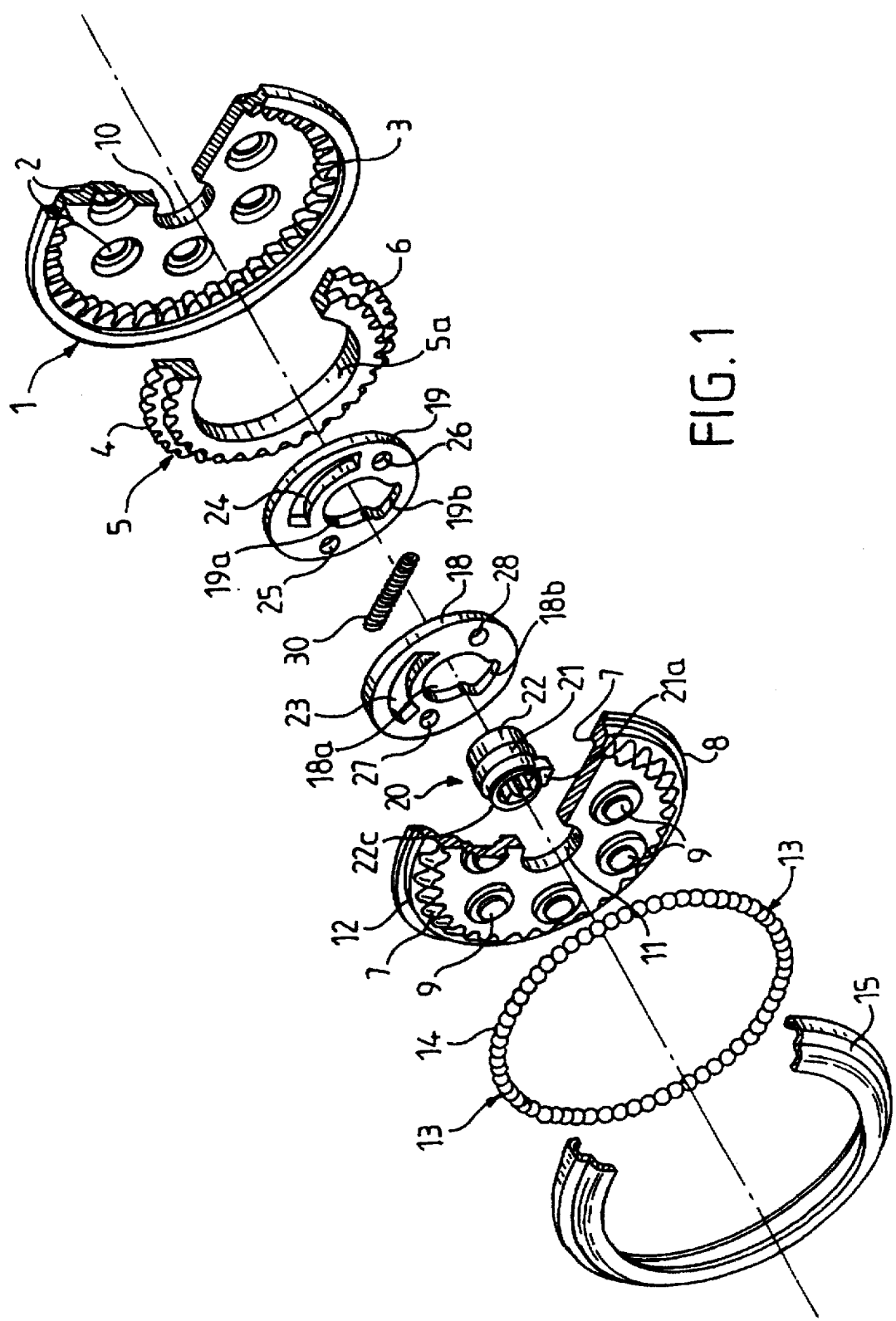
FIG. 1 is an exploded perspective view of a first embodiment of the articulation.

In FIG. 1, the articulation includes a fixed flange 1 which is connected to the framework of the seat by welding or other attachment means to channel 10. Protrusions 2 are semi-cut in the bottom of the flange. The fixed flange 1 includes inner toothing 3 adapted for cooperating with an articulation element such as first outer toothing 4 of satellite 5, the second outer toothing 6 meshes partially with inner toothing 7 of mobile flange 8. The mobile flange 8 being attached to the seat-back framework via protrusions 9.

Figure 2:
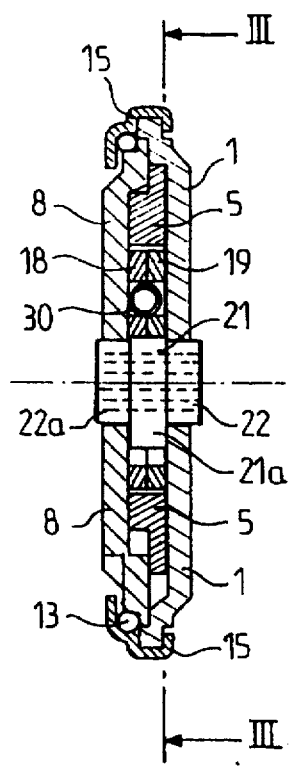
FIG. 2 is a diametrical sectional view of the articulation of FIG. 1.

The central portion of the fixed flange 1 is formed with a channel 10 corresponding to the central channel 11 of the mobile flange 8. As shown in FIGS. 1 and 2, the outer periphery 12 of the mobile flange 8 receives a crown 13 made of balls 14, and the connection between the fixed flange 1 and the mobile flange 8 is provided by a crimped ring 15.

Two discs 18 and 19 are placed inside the recessed portion 5a of satellite 5 and are mounted on an axis 20 including a central bearing surface 21 of large diameter formed with an outwardly extending snug 21a, while the two other ends of axis 20 are made of cylindrical extensions 22 and 22a having a diameter equal to the diameter of channels 10 and 11 formed in the fixed flange 1 and the mobile flange 8, respectively.

Figure 3:
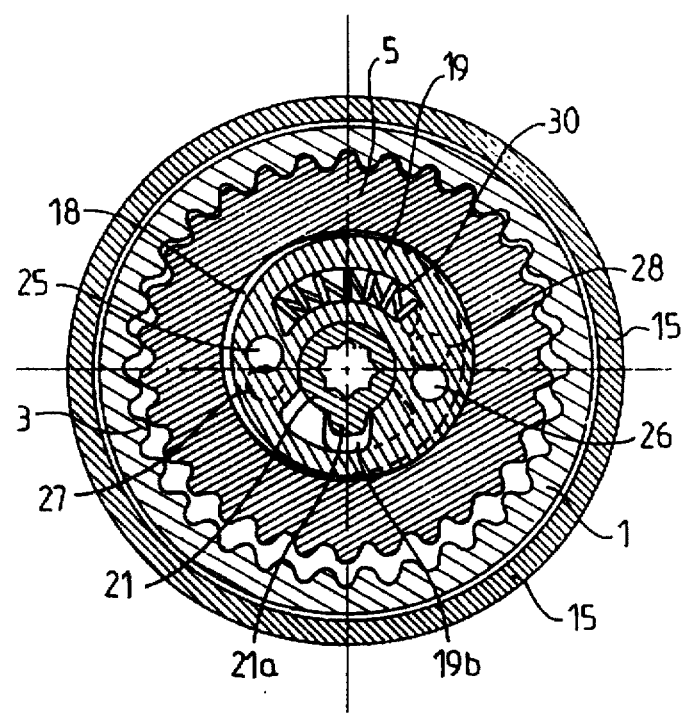
FIG. 3 is a sectional view along line III—III of FIG. 2.
Figure 3A:
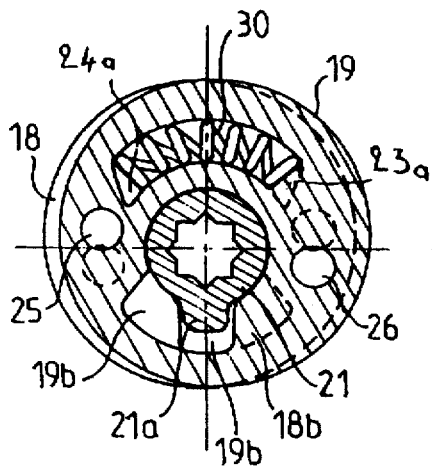
FIG. 3A is a partial view of FIG. 3 at a larger scale, showing frontwardly and in a non-setting position the eccentric cam discs.
Figure 4:
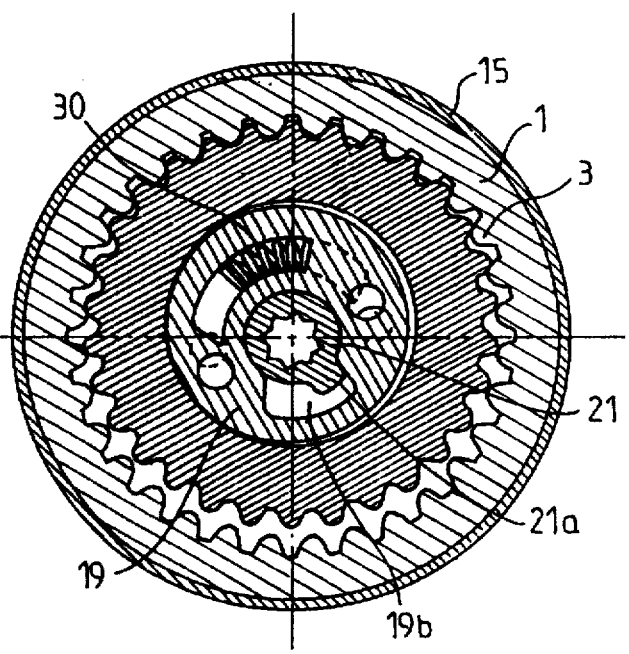
FIG. 4 shows the articulation of FIG. 3 in a driving position of the satellite.

The discs 18 and 19 placed in the recessed portion 5a of satellite 5 have the same outer non-circular shape, as shown in FIG. 4. FIG. 4 clearly shows that the recessed portion 5a of the satellite is circular, while the superimposed discs 18, 19 have identical shapes and do not completely fill the circular recessed portion 5a of the satellite. In FIG. 3 and enlarged FIG. 3A, the discs are shown in a non-setting position, spaced apart from one another in order to form almost a full circle occupying the entire central bore of the satellite. Disc 19 is offset to the right while disc 18 is offset to the left. Moreover, the central recess 18a (FIG. 1) is extended in its lower portion by a hollow housing 18b, and the central recess 19a (FIG. 1) by a hollow housing 19b, these two housings being equally offset, one (18b) to the right and the other (19b) to the left.

Each disc includes an arc-shaped window. Disc 18 has arc-shaped window 23 (FIG. 1) and disc 19 has arc-shaped window 24 (FIG. 1). These arc-shaped windows are concentric to the central axis of each disc. One end of arc-shaped window 23 includes a recess 23a, while the opposite end of arc-shaped window 24 includes a recess 24a. The two recesses 23a and 24a allow one end of a resilient member 30 to bear on disc 18 and the other end of resilient member 30 to bear on disc 19.

Each disc includes positioning holes. Disc 19 includes positioning holes 25 and 26, while disc 18 includes positioning holes 27 and 28. The positioning holes on each disc are located geometrically opposite to one another and are angularly offset relative to a horizontal axis as shown most clearly in FIG. 3A.

Resilient member 30 is housed in arc-shaped windows 23 and 24 of discs 18 and 19, respectively, and are used to couple the discs to one another on the central bearing surface 21 of axis 20. Resilient member 30 may be, for example, either a spring as shown in FIGS. 1 through 4, or a resilient block as shown in FIGS. 5 through 11.

When in a non-setting position, the mechanism occupies the position shown in FIGS. 3 and 3A. The snug 21a occupies a central position and the two discs 18, 19 are spaced apart from one another. Because the outer shape of the discs is non-circular, they have a tendency to push the satellite 5 upwardly, and engage toothings 4 and 6 of the satellite against the toothing of either fixed flange 1 or mobile flange 8. The discs 18, 19 also tend to block the satellite 5 in rotation. The position of the mechanism can be changed with the assistance of either a manual control or an electric motor which rotates the axis 20, causing the angular rotation of snug 21a, to first displace disc 19 and then displace disc 18, thus further compressing resilient member 30.

In this confined position discs 18 and 19 form a cam and may be driven simultaneously. By rotating inside the recessed portion 5a of satellite 5, the discs cause the rotation of satellite 5. Typical of all double satellite articulation mechanisms, toothing 4 of satellite 5 rolls inside toothing 3 of fixed flange 1. The concurrent rotation of toothing 6 of satellite 5 consequently drives mobile flange 8 via toothing 7.

When the desired articulation position is reached, the rotation of axis 20 is stopped and at that moment the snug 21a resumes its central position. Under the effect of the resilient member 30, the discs 18, 19 then move away from one another once again. This results in a blockage of the satellite toothings in the bottom of the toothings of one of the flanges, either the fixed flange 1 or the mobile flange 8, thereby taking up the clearance which can exist due to the irregularities of the toothings when they are cut. Also, a blockage in rotation of the satellite is obtained by the eccentricity of the discs 18, 19, which provides for irreversibility of the articulation. Depending on the direction of rotation of axis 20, the identical operation takes place in the clockwise and in the counter-clockwise directions.

FIGS. 5 and 6 show discs 18 and 19 as they bear on semi-cut portions 1a and 8a of flanges 1 and 8, which guide axis 120. The advantage of this alternative embodiment resides in the fact that the discs are directly centered on the flanges and no longer centered on the axis. The operation of this embodiment being identical to that previously described.

FIGS. 7 and 8 show discs 18 and 19 bearing on the same bearing 8c of mobile flange 8, which further improves the centering of the discs on the flanges. The operation of this embodiment being identical to that previously described.

Figure 9:
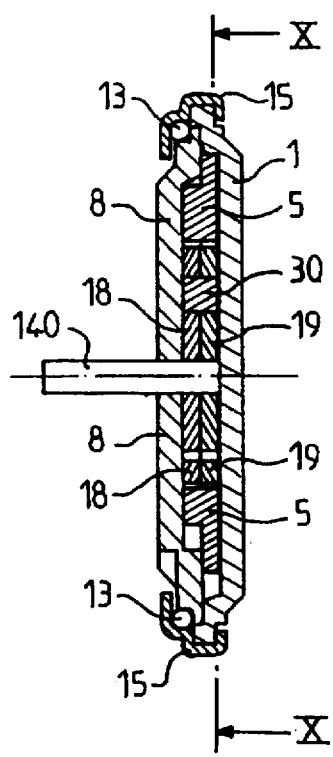
FIG. 9 is a sectional view along line XI—XI of FIG. 10 of the articulation of FIG. 5 when mounted with the assistance of two dip rods.
Figure 10:
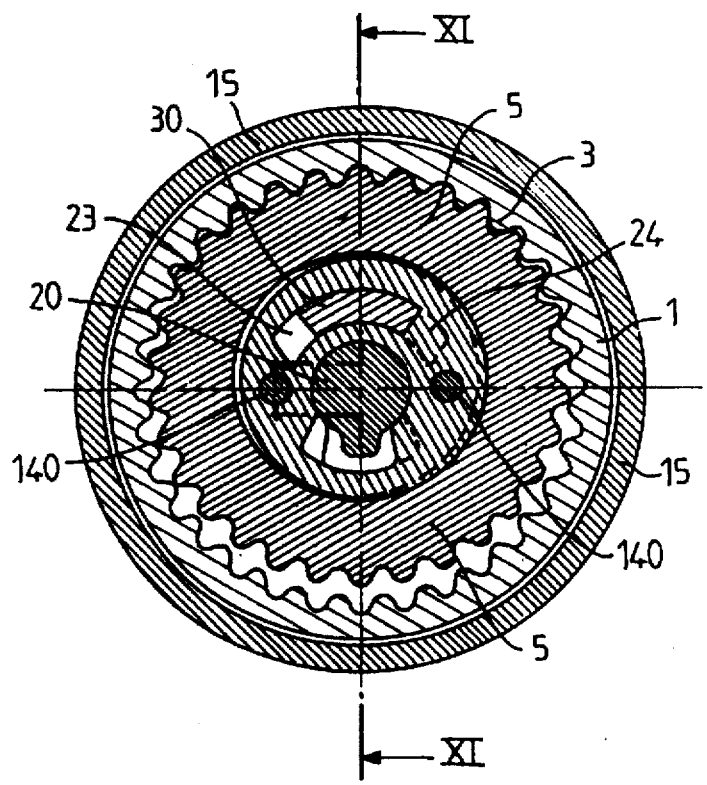
FIG. 10 is a sectional view along line X—X of FIG. 9 when mounting the eccentric in the articulation.

FIGS. 9 and 10 show an articulation mechanism using dip rods 140, one extending through holes 25 and 27 of discs 19 and 18, respectively. The other extending through holes 26 and 28 of discs 19 and 18, respectively. The dip rods 140 allow the position of the double cam to be set in the recessed portion 5a of satellite 5, in the event that the resilient element 30 is further compressed.

Figure 11:
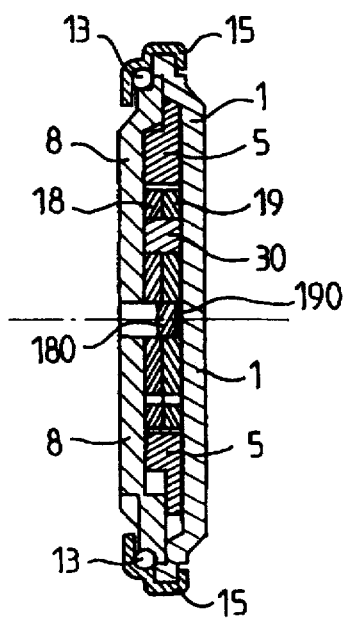
FIG. 11 is a sectional view along line XI—XI of FIG. 10 of the articulation of FIG. 5 when mounted with the assistance of semi-cut portions.

In FIG. 11, the dip rods 140 of FIGS. 9 and 10 are replaced by semi-cut portions 180 formed in disc 18 which engage holes 190 of disc 19. When mounted, the semi-cut portions 180 are pressed inside holes 190, thus freeing the two discs relative to one another. The mounting mechanical members, such as dip rods 140 or semi-cut portions 180, can be advantageously replaced by temporarily gluing one disc to the other. The glue can thereafter be removed when the articulation is first used.

While the articulations described above use a double satellite as the articulation element to connect the fixed and mobile flanges, the invention is also usable in an articulation in which the mobile flange comprises the articulation element so that the fixed and mobile flanges interact directly with each other, as shown in FIG. 12.

In FIG. 12, the parts identical to those of FIGS. 1–11 have the same reference numerals, and their description is not repeated. In fact, the difference between the embodiment of FIGS. 1–11 and that of FIG. 12 is that the alternative embodiment illustrated in FIG. 12 does not show a satellite 5, but instead shows a pinion P rigidly connected to the fixed flange 3, and a flange F similar to the mobile flange 8 but having an outer toothing, as shown in FIG. 12A, which engages the toothing T of the pinion P. The flange F is subjected to an orbital movement, while an intermediate part I, similar to the crown 13 of FIG. 1, is provided between the flange F and crimped ring 15.

That which is claimed is:

1. An articulation for an automobile seat comprising
a mobile flange;
a fixed flange comprising a fixed flange inner toothing;
an eccentric means positioned between said mobile flange and said fixed flange for biasing an articulation element, said eccentric means comprising
 a driving axis provided with an outwardly extending snug;
 a pair of opposed discs rotatable about said driving axis relative to one another, each disc having a central recess and an arc-shaped window formed therethrough, the central recess of each of said discs surrounding said axis and having a hollow housing extending therefrom adapted for receiving said snug; and
 a resilient member housed within the arc-shaped windows of said discs;
said discs ensuring a clearance take-up and irreversibility of the articulation when spaced apart from one another.

2. An articulation according to claim 1 wherein said articulation element is an annular double satellite comprising a first outer toothing for cooperating with said fixed flange inner toothing and a second outer toothing for cooperating with inner toothing provided on said mobile flange.

3. An articulation according to claim 2 wherein the hollow housings of said discs are angularly offset when said discs are spaced apart from one another such that when said axis is rotated said snug acts first on one of said discs and then on both of said discs simultaneously to release the bias on said double satellite.

4. An articulation according to claim 1 wherein each arc-shaped window of said discs comprises a bearing surface on each end for cooperating with said resilient member.

5. An articulation according to claim 1 further comprising a crimped ring for securing said fixed flange to said mobile flange and a crown for permitting rotation of said mobile flange relative to said fixed flange and said crimped ring.

6. An articulation according to claim 1 wherein said fixed flange and said mobile flange each comprise semi-cut portions for guiding said snug of said axis.

7. An articulation according to claim 1 wherein said discs bear against a bearing flange provided on at least one of said fixed flange and said mobile flange.

8. An articulation according to claim 1 wherein each of said discs further has a pair of diametrically opposed holes formed therethrough, the pairs of holes of each disc offset angularly relative to the pairs of holes of the other when said resilient member is compressed, the holes receiving mounting rods for defining a control cam provided by said discs when said resilient member is further compressed.

9. An articulation according to claim 1 wherein one of said discs comprises a pair of semi-cut portions for engaging a pair of holes provided on the other one of said discs.

10. An articulation according to claim 1 wherein said discs are rigidly secured relative to one another in a mounting position.

11. An articulation according to claim 1 wherein said mobile flange comprises said articulation element and said fixed flange inner toothing cooperates with outer toothing provided on said mobile flange.

12. An articulation according to claim 11 wherein the hollow housings of said discs are angularly offset when said discs are spaced apart from one another such that when said axis is rotated said snug acts first on one of said discs and then on both of said discs simultaneously to release the bias on said mobile flange.

13. An articulation according to claim 11 wherein each arc-shaped window of said discs comprises a bearing surface on each end for cooperating with said resilient member.

14. An articulation according to claim 11 further comprising a crimped ring for securing said fixed flange to said mobile flange and a crown for permitting rotation of said mobile flange relative to said fixed flange and said crimped ring.

15. An articulation according to claim 11 wherein said fixed flange and said mobile flange each comprise semi-cut portions for guiding said snug of said axis.

16. An articulation according to claim 11 wherein said discs bear against a bearing flange provided on at least one of said fixed flange and said mobile flange.

17. An articulation according to claim 11 wherein each of said discs further has a pair of diametrically opposed holes formed therethrough, the pairs of holes of each disc offset angularly relative to the pairs of holes of the other when said resilient member is compressed, the holes receiving mounting rods for defining a control cam provided by said discs when said resilient member is further compressed.

18. An articulation according to claim 11 wherein one of said discs comprises a pair of semi-cut portions for engaging a pair of holes provided on the other one of said discs.

19. Art articulation according to claim 11 wherein said discs are rigidly secured relative to one another in a mounting position.

20. An articulation according to claim 11 wherein said resilient member is a spring.

21. An articulation for an automobile seat comprising
a mobile flange comprising a mobile flange inner toothing;
a fixed flange comprising a fixed flange inner toothing;
an annular double satellite comprising a first outer toothing for cooperating with said fixed flange inner toothing and a second outer toothing for cooperating with said mobile flange inner toothing, said double satellite defining a central bore;
an eccentric means positioned within the central bore of said double satellite for biasing said double satellite, said eccentric means comprising
 a driving axis provided with an outwardly extending snug;
 a pair of opposed discs rotatable about said driving axis relative to one another, each disc having a central recess and an arc-shaped window formed therethrough, the central recess of each of said discs surrounding said axis and having a hollow housing extending therefrom adapted for receiving said snug; and
 a resilient member housed within the arc-shaped windows of said discs;
said discs ensuring a clearance take-up and irreversibility of the articulation when spaced apart from one another.

22. An articulation for an automobile seat comprising
a mobile flange comprising a mobile flange outer toothing and defining a central bore;
a fixed flange comprising a fixed flange inner toothing for cooperating with said mobile flange outer toothing;
an eccentric means positioned within the central bore of said mobile flange for biasing said mobile flange, said eccentric means comprising a driving axis provided with an outwardly extending snug;

a pair of opposed discs rotatable about said driving axis relative to one another, each disc having a central recess and an arc-shaped window formed therethrough, the central recess of each of said discs surrounding said axis and having a hollow housing extending therefrom adapted for receiving said snug; and a resilient member housed within the arc-shaped windows of said discs;

said discs ensuring a clearance take-up and irreversibility of the articulation when spaced apart from one another.

* * * * *

UNITED STATES PATENT AND TRADEMARK OFFICE
CERTIFICATE OF CORRECTION

PATENT NO. : 5,725,452
DATED : March 10, 1998
INVENTOR(S) : Georges Droulon
Francois Baloche It is certified that error appears in the above-indentified patent and that said Letters Patent is hereby corrected as shown below:

On the title page, item [73] Assignee:

Change "Autombile" to -- Automobile --.

Signed and Sealed this

Twenty-third Day of February, 1999

Attest:

Q. TODD DICKINSON

*Attesting Officer*  *Acting Commissioner of Patents and Trademarks*